(12) United States Patent
Guigné et al.

(10) Patent No.: US 8,077,091 B1
(45) Date of Patent: Dec. 13, 2011

(54) SYSTEM AND METHOD FOR DETERMINING A POSITION OF A MOBILE DEVICE WITHIN A SURVEILLANCE VOLUME IN THE PRESENCE OF MULTIPATH INTERFERENCE

(75) Inventors: Jacques Y. Guigné, Paradise (CA); James A. Stacey, Paradise (CA); Nicholas G. Pace, Bath (GB); Andre Pant, Paradise (CA)

(73) Assignee: Intelligent Sciences, Ltd., Paradise, CA (US)

( * ) Notice: Subject to any disclaimer, the term of this patent is extended or adjusted under 35 U.S.C. 154(b) by 0 days.

(21) Appl. No.: 12/830,472

(22) Filed: Jul. 6, 2010

(51) Int. Cl.
*G01S 3/48* (2006.01)
*G01S 5/06* (2006.01)

(52) U.S. Cl. ............... 342/465; 342/442; 342/451

(58) Field of Classification Search ............ 342/451, 342/465, 442; 455/456.1–456.6
See application file for complete search history.

(56) References Cited

U.S. PATENT DOCUMENTS

| | | | |
|---|---|---|---|
| 6,901,264 B2 * | 5/2005 | Myr | 455/456.5 |
| 7,800,541 B2 * | 9/2010 | Moshfeghi | 342/465 |
| 2002/0180640 A1 * | 12/2002 | Gilkes et al. | 342/387 |
| 2006/0166681 A1 * | 7/2006 | Lohbihler | 455/456.2 |
| 2009/0325598 A1 * | 12/2009 | Guigne et al. | 455/456.1 |

* cited by examiner

*Primary Examiner* — Thomas Tarcza
*Assistant Examiner* — Cassie Galt
(74) *Attorney, Agent, or Firm* — Richard A. Fagin

(57) ABSTRACT

A system of determining a position of a mobile device within a surveillance volume includes a phase difference array comprising a spatially diverse array of N sensors for detecting RF signals from the mobile device and acquiring phase difference data from the RF signals, N being greater than 4. The system includes a processor for processing the phase difference data and determining the position of the mobile device from the phase difference data.

21 Claims, 10 Drawing Sheets

SYSTEM AND METHOD FOR DETERMINING A POSITION OF A MOBILE DEVICE WITHIN A SURVEILLANCE VOLUME IN THE PRESENCE OF MULTIPATH INTERFERENCE

BACKGROUND

1. Field of the Invention

The invention relates generally to radio location systems. More specifically, the invention relates to a system and method for mitigating multipath interference in a radio location system including a phase difference array.

2. Description of Related Art

U.S. Patent Application Publication No. 2009/0325598 (Guigne et al.) discloses a radio location system based on a phase difference array (PDA). If P is the actual position of an object and R is a statistical measure of accuracy, then a system having an accuracy R can locate the object with an error less than R with a probability Q. The lower the value of R for a given value of Q, the higher the accuracy. The PDA radio location system measures position P with an accuracy of less than 5 cm (i.e., R<5 cm) with a probability of 68% (i.e., Q=0.68) in the absence of interference. High accuracy accords the PDA radio location system a competitive advantage over other radio location systems and allows the PDA radio location system to enable new classes of location-aware applications, such as location-based advertising at point of sale, assistive technologies, and indoor navigation systems. The PDA radio location system achieves high accuracy over a relatively short range (depending on the radio technology being used and the power of the client's transmitter), which defines the PDA radio location system as part of the near-field communications market. The only other radio technology that appears to offer accuracy comparable to the PDA radio location system is Ultra-Wideband (UWB) radio technology at an accuracy of approximately 15 cm. Other radio technologies are progressively worse in overall accuracy: Wireless Local Area Network (WLAN) technology at approximately 3-5 m, Bluetooth at approximately 2-15 m, Global Positioning System (GPS) at approximately 10 m outdoors, and Enhanced 911 (E911) technology at 50 m to 300 m.

The PDA radio location system provides high accuracy by calculating phase differences across a small compact array of antennas that is insensitive to most internal and external sources of phase noise. Although the PDA employs multiple antennas, the underlying technology of the PDA radio location system is not that of a phased array. An important difference between the PDA and traditional phased arrays is that the PDA provides a steady-state output of phase differences optimized for position calculations, whereas phased arrays are acting as spatial-temporal filters to optimize communications with position being a by-product of optimizing the signal-to-noise across the array. In the PDA radio location system, the activities of location and communications are complementary as the processing of the steady-state phase difference signals proceeds independently of the processing of the superposed communications signals. The contributions of the signal modulations to the phases cancel out when phase differences are calculated.

Multipath interference makes radio frequency location very difficult. There is a substantial body of research on mitigating multipath for traditional radio location technologies. The present invention represents the first research results on multipath mitigation for PDA radio location systems in the indoor radio environment. The main components of multipath interference are due to delay spread and angle spread. Angle spreading is due to multipath scattering in the immediate neighborhood of the transmitter, e.g., radio frequency (RF) reflections from the user, and is an issue common to all location systems. Angle spread may be considered as the time-dependent impulse response of the user. Delay spread is due to the impulse response of the indoor environment. The received signal at an antenna in the presence of delay spread is the convolution of the direct signal with the impulse response of the indoor environment. The indoor room environment's impulse response will be characterized by various length scales, e.g., the length, width and height of a given room, thickness and structure of walls, thickness and structure of floors and ceilings, the presence of obstructing objects within the room such as furniture and people, and the reflection coefficients corresponding to all of the preceding length scales. The impulse response is going to include all these effects, some of which are dynamic. In particular, the presence of people in the room will affect the overall response of the indoor environment. Thus, there are two components of delay spread: time-independent and time-dependent. The time-independent component of delay spread is due to those aspects of the room that do not change with time, i.e., infrastructure. The time-dependent components of delay spread would be due to those aspects of the room that do change with time, e.g., people moving around in the room. The orientation of the user and the user's mobile device would provide additional time-dependence of the indoor response.

Multipath signals can coherently interfere with direct path signals, and dealing with this interference is a strategic part of the PDA radio location system. The unique nature of multipath interference for PDA follows from its use of narrowband radio signals and steady-state phase differences across a geometric array of multiple sensors. In this approach, the effects of multipath are folded into the signal and multipath interference must be explicitly modeled and removed. In the Guigne et al. publication, the slope of measured phase differences between a satellite sensor and a reference sensor, called a receiver pair, versus frequency yielded a robust measure of the time difference of arrival (TDOA) of the radio signals between the receivers in that receiver pair even in the presence of multipath. The technique disclosed in the Guigne et al. publication is the first level of multipath mitigation, as it is possible to observe multipath interference as a function of frequency over multiple channels of a band of radio frequencies. The present invention expands on the mitigation technique disclosed in the Guigne et al. publication. In contrast to the PDA radio location system, the solution to the multipath interference problem for typical TDOA radio location systems requires accurate timing circuits and broadband pulses in order to separate the time of arrival (TOA) of the direct signal and isolate this signal from the later arrivals of multipath signals. This requires at least three base stations to be deployed in the same surveillance volume as served by the PDA radio location system. The PDA radio location system only requires one base station.

SUMMARY

In one aspect of the present invention, a system of determining a position of a mobile device within a surveillance volume comprises a phase difference array comprising a spatially diverse array of N sensors for detecting radio frequency (RF) signals from the mobile device and acquiring phase difference data from the RF signals, N being greater than 4. The system further includes a processor for determining the position of the mobile device from the phase difference data.

In another aspect of the invention, a method of determining a position of a mobile device within a surveillance volume comprises synchronizing communications between a phase difference array comprising a spatially diverse array of N sensors and the mobile device, N being greater than 4. The method further includes acquiring phase difference data as a function of time using the phase difference array and determining phase differences for a plurality of receiver pairs defined for the phase difference array, each receiver pair consisting of a unique pair of the sensors in the spatially diverse array of N sensors. The method further includes determining the position of the mobile device from the phase differences. The method further includes at least one of storing the position of the mobile device and transmitting the position of the mobile device to a location within or outside of the surveillance volume.

These and other aspects of the present invention are described in detail below.

BRIEF DESCRIPTION OF DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

Figure 1:
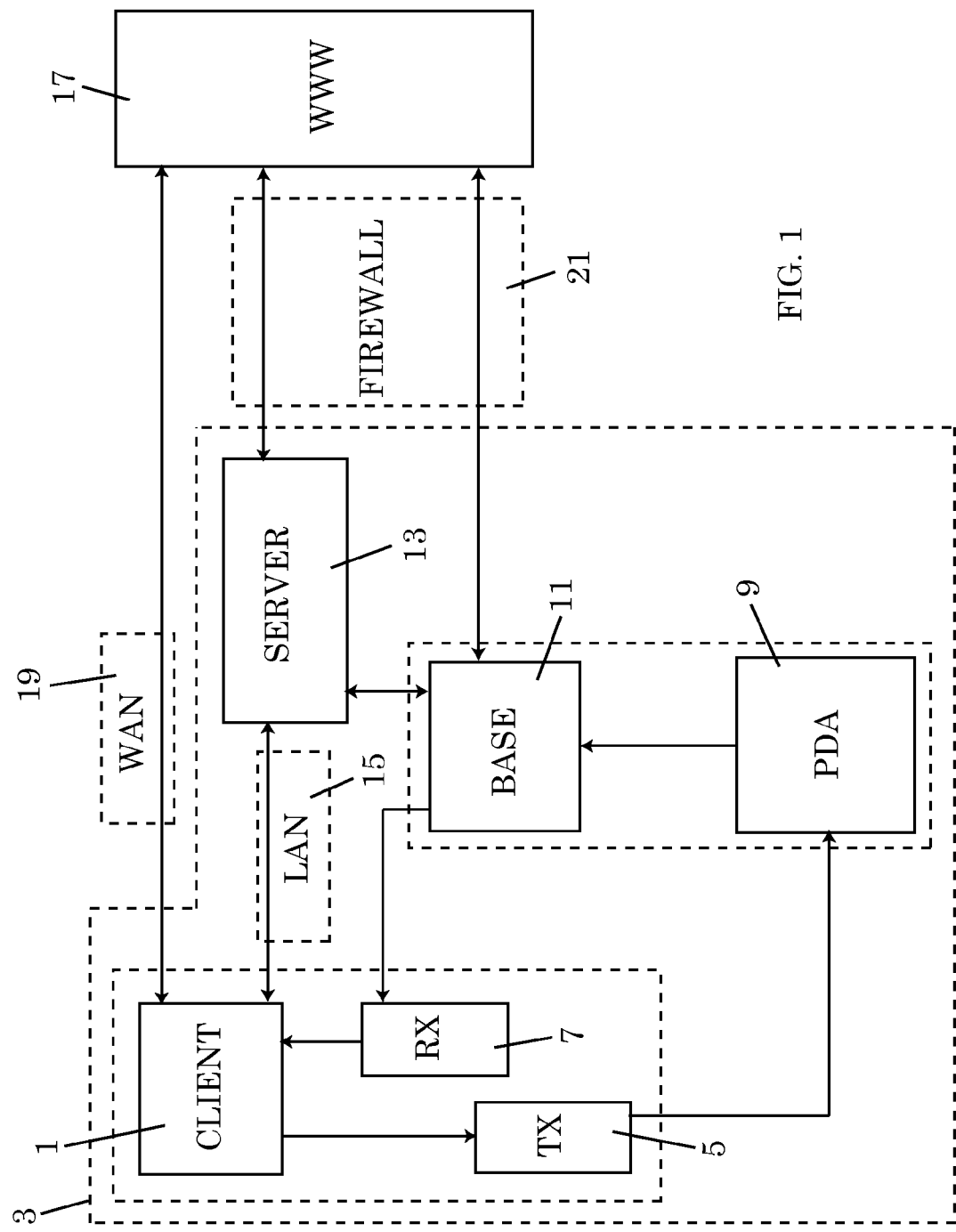
FIG. 1 is a block diagram of a system for determining a position of a client device within a surveillance volume and providing a service to the client device based on the position.

In the following detailed description, numerous specific details may be set forth in order to provide a thorough understanding of embodiments of the invention. However, it will be clear to one skilled in the art when embodiments of the invention may be practiced without some or all of these specific details. In other instances, well-known features or processes may not be described in detail so as not to unnecessarily obscure the invention. In addition, like or identical reference numerals may be used to identify common or similar elements.

The present invention is directed to mitigating multipath interference for radio location systems based on the phase difference array (PDA) of the Guigné et al. publication. The PDA radio location system provides high accuracy by calculating phase differences across a small compact array of antennas that is insensitive to most internal and external sources of phase noise. Multipath signals can coherently interfere with direct path signals, and dealing with this interference is a strategic part of the PDA radio location system. The unique nature of multipath interference for PDAs follows from its use of narrowband radio frequency (RF) signals and steady-state phase differences across a geometric array of multiple sensors. In this approach, the effects of multipath are folded into the signal, and multipath interference must be explicitly modeled and removed. In the present invention, the PDA radio location system manages the temporal diversity of the received RF signals to output steady-state phase differences across the array. Plotting the measured phase differences between a satellite sensor and a reference sensor, called a receiver pair, over a sufficient range of frequencies illustrates the frequency dependence of the phase differences due to multipath interference. As will be shown below, the linear slopes of the observed phase differences with frequency yields a robust measure of the time difference of arrival (TDOA) of the RF signals between the receivers in that receiver pair even in the presence of multipath. This technique is referred to as the frequency diversity technique of the PDA radio location system. Finally, the present invention shows how managing spatial diversity in the numbers and locations of individual receiver antennas contributes to mitigating multipath interference. It is also shown that accurate localization with PDA radio location systems is strongly dependent on robust methods of correcting for phase wrapping errors. The present invention includes methods for calculating accurate positions of client transmitters.

FIG. 1 shows a block diagram of a client device (CLIENT) 1 within a surveillance volume 3. In one or more embodiments, the client device 1 is a mobile electronic device, in particular, a mobile electronic device equipped with wireless functionality. In one or more embodiments, the surveillance volume 3 is an indoor environment. The client device 3 is coupled to a transmitter (TX) 5 and a receiver (RX) 7. The transmitter 5 and receiver 7 may be integral components of the client device 3. Transceivers may be substituted for transmitter 5 and receiver 7. The client device 1 emits RF signals into the surveillance volume through the transmitter 5. A phase difference array (PDA) 9 located within the surveillance volume 3 detects the signals emitted by the transmitter 5. The phase difference array 9 is coupled to a base station (BASE) 11. The base station 11 and phase difference array 9 may be regarded as a radio. In one or more embodiments, the radio is implemented with Bluetooth technology. The base station 11 communicates with the client device 1 via the receiver 7. The client device 1 and base station 11 may communicate with a backend server (SERVER) 13 via a local area network (LAN) 15. The client device 1 may communicate with the World Wide Web (WWW) 17 via a wide area network (WAN) 19, and the backend server 13 and base station 11 may communicate with the WWW 17 through a firewall 21. With this system, the transmitter 5 emits RF signals representative of the location of the client device 1. The phase difference array 9 detects the RF signals, conditions the signals, determines phase differences from the signals, and transmits the phase differences to the base station 11. The base station 11 computes the position of the client device 1 using the phase differences and transmits the position of the client device 1 to at least one of the client device 1, backend server 13, and WWW 17. Either of the backend server 1 and WWW 17 may provide a location-based service to the client device 1 based on the position of the client device 1 reported by the base station 11.

Figure 2:
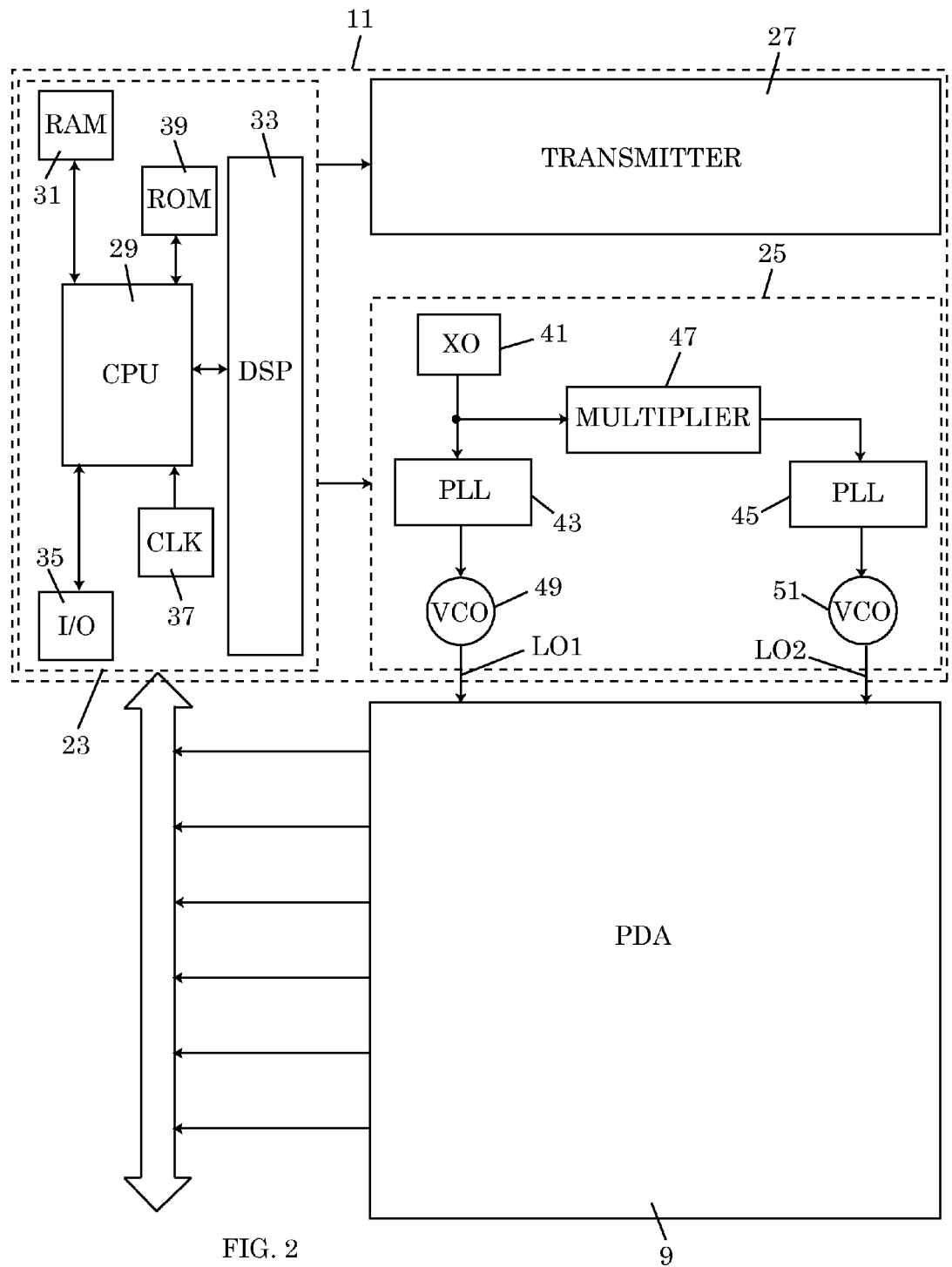
FIG. 2 is a circuit-block diagram of a radio system including a phase difference array with a spatially diverse array of sensors.

FIG. 2 shows a block diagram of the radio including the base station 11 and phase difference array (PDA) 9 according to one embodiment of the present invention. In this embodiment, the base station 11 includes a baseband processor 23, a frequency hop control circuit 25, and a transmitter 27. The baseband processor 23 includes a microprocessor (CPU) 29 with random access memory (RAM) 31 that can be shared with a digital signal processor (DSP) 33. The baseband processor 23 also includes an input/output (I/O) 35 for communication, an internal clock (CLK) 37, and a flash memory (ROM) 39. The routines for determining position as well as data can be stored in memory 31. The frequency hop control circuit 25 includes a crystal-controlled oscillator (XO) 41, phase locked loops (PLLs) 43 and 45, a multiplier 47, and voltage controlled oscillators (VCOs) 49 and 51. XO 41 outputs a reference frequency, which is provided to the PLLs 43, 45. The PLL 45 sees a multiple of the reference frequency because of the multiplier 47. The outputs of the PLLs 43, 45 are provided to the VCOs 49, 51, respectively. The outputs LO1 and LO2 of the VCOs 49, 51, respectively, are provided to down-conversion stages (not shown in FIG. 2) of the phase difference array 9. The advantage gained by coupling all the receiver electronics in this way is that phase errors (phase noise) introduced by the oscillators in the frequency channel synthesizer circuit are correlated across the PDA 9 and will cancel out when phase differences are measured by the PDA 9. Typically, the transmitter 27 would include digital-to-analog conversion, up-conversion, power amplification, and switching circuits to isolate the transmitter functionality of the radio from the receiver functionality of the radio—none of these transmitter components are shown to avoid obscuring the present invention. The advance in the state of the art achieved by embodiments of the present invention is in receiving RF signals using a spatially diverse phase difference array and not in transmitting RF signals.

Figure 3:
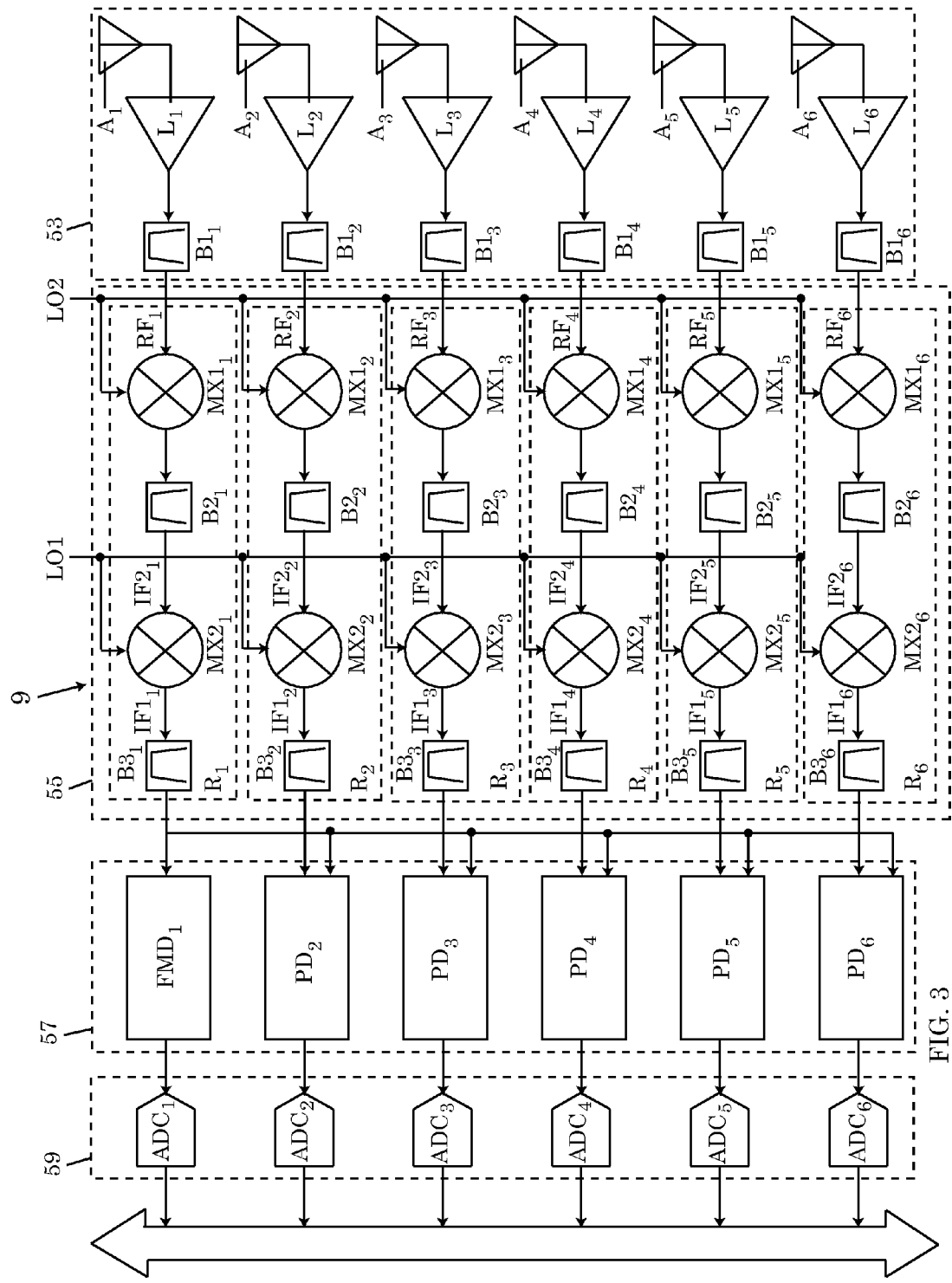
FIG. 3 is a circuit diagram of the phase difference array of FIG. 2.

FIG. 3 shows a system diagram of the phase difference array 9 according to one embodiment of the present invention. The phase difference array 9 includes an antenna section 53, a receiver channel section 55, a phase difference measurement section 57, and an analog-to-digital conversion section 59. The antenna section 53 includes an array of antenna sensors $A_i$, an array of low noise amplifiers $L_i$, an array of band pass filters $B1_i$, where i=1 . . . N and N>4. For illustration purposes, N=6 in FIG. 3. As will be further described below, the physical arrangement of the antenna sensors $A_i$ is such that the array of antenna sensors $A_i$ is spatially diverse. The receiver channel section 55 includes an array of receiver channels $R_i$, where i=1 . . . N, as described above. Each receiver channel $R_i$ has an associated antenna sensor $A_i$ in the antenna section. Analog or digital implementations of the receiver electronics are possible.

For each $R_i$, an antenna sensor $A_i$ detects a signal $RF_i$ emitted by the transmitter (5 in FIG. 1) of the client device (1 in FIG. 1). The signal $RF_i$ passes through $L_i$ and $B1_i$ to the corresponding receiver channel $R_i$ for conditioning. Within receiver channel $R_i$, $RF_i$ is passed into a downconversion mixer $MX1_i$. $RF_i$ is combined with LO2 (the output of VCO 51 in FIG. 2) in $MX1_i$ to down-convert $RF_i$ to an intermediate carrier frequency $IF2_i$. The modulation and phase of $RF_i$ are unchanged by this down-conversion. The output $IF2_i$ of $MX1_i$ is passed into a downconversion mixer $MX2_i$ through a band pass filter $B2_i$. $IF2_i$ is combined with LO1 (the output of VCO 49 in FIG. 2) in $MX2_i$ to down-convert $IF2_i$ to an intermediate carrier frequency $IF1_i$. The modulation and phase of $IF2_i$ are unchanged by this down-conversion. In general, down-conversion within a receiver channel $R_i$ may be in one or more stages. The embodiment shown in FIG. 3 uses a two-staged down-conversion within each $R_i$. To mitigate systematic phase errors in the phase difference array, a single PLL (43 or 45 in FIG. 2) is used for each stage of the down-conversion so that most sources of phase modulation are the same across all the receiver channels $R_i$. This can also be interpreted as setting a particular frequency channel (characterized by a central frequency and a channel bandwidth specified in Hz) across all the array of receiver channels $R_i$ in the spatially diverse phase difference array 9. The output $IF1_i$ of $MX2_i$ is passed through band pass filter $B3_i$ into the phase difference measurement section 57.

The phase difference measurement section 57 includes a FM demodulator circuit $FMD_1$ and an array of N-1 phase detector circuits $PDj$, where j=2 . . . N. Each phase detector circuit may be represented by $PD_j$, where j is a number from 2 to N. Analog or digital implementations of the phase detector circuits $PD_j$ are possible. The analog-to-digital conversion section 59 includes an array of N analog-to-digital converters $ADC_i$, where i=1 . . . N. $FMD_1$ receives $IF1_1$, infers the frequency demodulation of $IF1_1$, and outputs the envelope of the demodulated signal to $ADC_1$, which converts the analog voltage to a digital output. The $FMD_1$ module represents the known art of extracting the communications data superposed on the RF carrier signal. Not shown are electronic modules that enable similar processing of all the receivers in the array to enhance the signal-to-noise of received data communications, such techniques being known to advantageously increase the quality and speed of such communications. Each $PD_j$ receives a corresponding $IF1_j$ and a copy of $IF1_1$. Each $PDj$ computes the phase difference between $IF1_j$ and $IF1_1$. The output of $PD_j$ is passed to $ADC_j$, where j=2 . . . N, for conversion from an analog voltage to a digital output. The output of each phase detector circuit $PD_j$ is digitized at a much lower frequency than the intermediate frequency $IF1_j$, and the choice of sampling frequency may be made over a wide range. The sampling period permits a modest amount of noise removal with appropriate filtering. An example sampling rate is 100 KHz. The dynamic range for a sample is typically 14-16 bits per sample. The total data rate with these choices of sampling parameters is about 1.6 Mbps. The output of each $ADC_i$, where i=1 . . . N, is routed to the baseband processor (23 in FIG. 2). In the Guigné et al. publication, the output of the $ADC_i$ may be temporally filtered to extract the steady-state phase differences with a higher level of precision, this precision translating into higher levels of accuracy in determining position. This technique manages the temporal (or time) diversity of the RF signals.

Multipath Interference Mitigation. Multipath signals can coherently interfere with direct path signals between the client's transmitter (5 in FIG. 1) and the phase difference array's antenna sensors ($A_I$, where $I=1 \ldots N$, in FIG. 3). Dealing with this interference for the special case of phase difference arrays is a strategic part of the methods and systems of the present invention. As will be shown below, the slope of measured phase differences between a satellite sensor and a reference sensor (called a receiver pair) versus frequency yields a robust measure of the time difference of arrival (TDOA) of RF signals between the sensors in that receiver pair even in the presence of multipath. This technique exploits the frequency diversity of phase difference signals in the presence of multipath and is the first level of multipath mitigation, as it is possible to observe multipath interference as a function of frequency over multiple channels of a band of radio frequencies, model this multipath interference, and remove the effects of multipath interference. Research into the present invention shows that the slope of the phase differences over a sufficient range of frequencies is a robust measure of the TDOA even in the presence of multipath. Systematic errors in the TDOA measurement due to multipath may be further mitigated by the use of a phase difference array with a spatially diverse array of sensors combined with a generalized position determination algorithm. The primary cause of positioning failures in the phase difference array is due to phase unwrapping errors. Spatial diversity of the phase difference array allows an additional consistency check of phase unwrapping to be performed that would otherwise be unavailable, significantly increasing the success rate on positioning and thereby increasing the overall accuracy of positioning.

Spatial Diversity. A phase difference array with $N>4$ antenna sensors is considered to become more spatially diverse when: (1) baselines (or separations) between sensors in a receiver pair are diverse; (2) azimuthal angles between receiver pairs are diverse; (3) distribution of azimuthal angles of receiver pairs is uniform; (4) placement of three sensors along any given line between sensors is avoided; (5) any parallel orientations of receiver pairs are avoided; and (6) sensors are located such that the sum of multipath errors across the phase difference array is approximately equal to zero. Spatially diverse phase difference arrays may be planar or non-planar. Both planar and non-planar spatially diverse phase difference arrays may be further classified as regular, irregular, or random arrays—this additional classification is due to the diversity in spatial orientations and baselines of receiver pairs. Any of these array types may be further optimized to enhance the orientations of the baselines of receiver pairs to satisfy some or all of the design criteria outlined above.

FIGS. 4A-4E show examples of planar (two-dimensional) arrays. In FIGS. 4A-4E and 5A-5B, the circles represent the sensors. A planar array is defined as an array with all its sensors defined in a single plane. With no loss of generality, this plane can be defined as the x-y plane and, in this case, the z-value of all the sensors is zero.

Figure 5A:
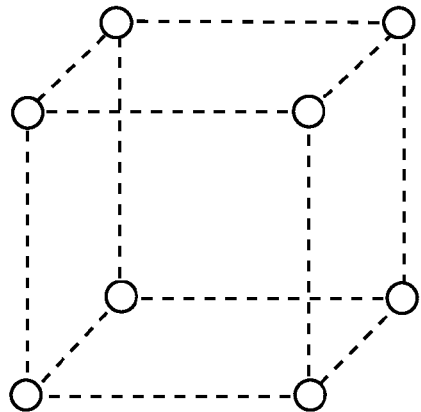
FIG. 5A is an example of a sensor array that is regular, non-planar, and cubical.
Figure 5B:
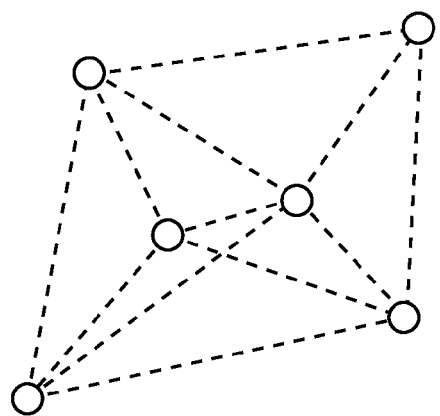
FIG. 5B is an example of a sensor array that is irregular and non-planar.

FIGS. 5A-5B show examples of non-planar (three-dimensional) arrays. A non-planar array is a generalization of the planar array, with the restriction on the z-value of the sensors being relaxed to allow non-zero z-values for each of the sensors.

Figure 4A:
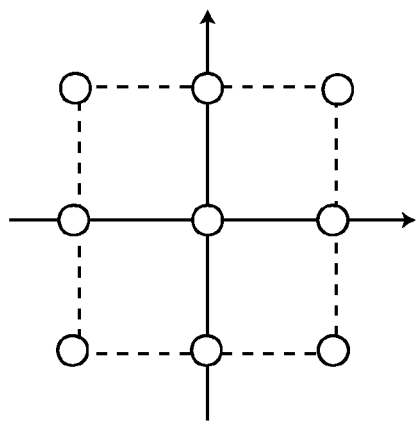
FIG. 4A is an example of a sensor array that is regular, planar, and square.
Figure 4B:
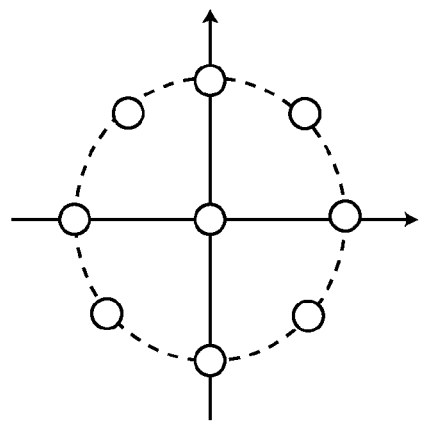
FIG. 4B is an example of a sensor array that is regular, planar, and circular.

FIGS. 4A, 4B, and 5A show examples of regular arrays. A regular array is normally defined as having a regular or symmetrical geometry. This symmetry may be defined on a triangle, square or on a circle (to mention only a few possible regular geometries). Replicating a square array allows grids of sensors to be defined in both planar and non-planar arrays (see FIGS. 4A and 5A). Similarly, sensors may be arranged at a constant radius from a central sensor and regular angular separations to form circular arrays (see FIG. 4B).

Figure 4C:
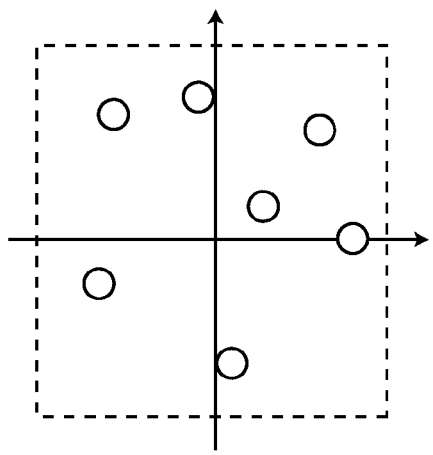
FIG. 4C is an example of a sensor array that is irregular and planar.

FIGS. 4C and 5B show examples of irregular arrays. An irregular array is defined as an array that does not have a regular or symmetrical geometry. An irregular array may be defined using a regular array as a starting point and using a known mathematical transformation of the coordinates of the array sensors to implement the irregular array. This transformation of sensor position allows diversity in orientations and baselines of receiver pairs to be implemented. A very simple example of an irregular array is a circular array where the angular separation of each sensor in the ring is assigned a different value.

Figure 4D:
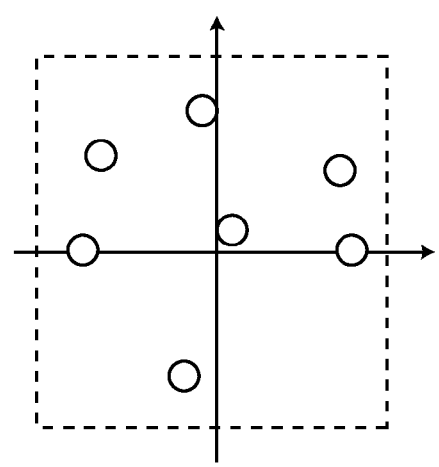
FIG. 4D is an example of a sensor array that is random and planar.

While all random arrays are irregular, not all irregular arrays are random. Thus random arrays are a subset of the set of irregular arrays. FIG. 4D shows an example of a random array. A random array may be designed using the Monte Carlo method, for example. A uniform distribution of positions of sensors can be generated using a uniform random number generator to generate candidate random geometries of any number of sensors in a square (or cube) centered on the origin. If ran is a random number generator that returns a uniform distribution of numbers on the interval [0,1], then the x-y position of the i-th sensor in a planar array may be generated in a square area by the equations:

$$x_i = 2\text{ran} - 1 \tag{1}$$

$$y_i = 2\text{ran} - 1 \tag{2}$$

Each reference to function ran generates a unique value on the interval [0,1]. Once a geometry of N sensors has been randomly generated, the spatial diversity of the array may be defined by an appropriately defined objective function that assigns a weight to the array that is large when the array has desirable spatial diversity (measured in terms of orientations and baselines of the receiver pairs). When a geometry has a large weight, this geometry may be recorded. By generating large numbers of such random geometries (thousands or millions of such geometries may be generated) and keeping only the geometry with the largest weight, a diverse random array may be generated by design.

Figure 4E:
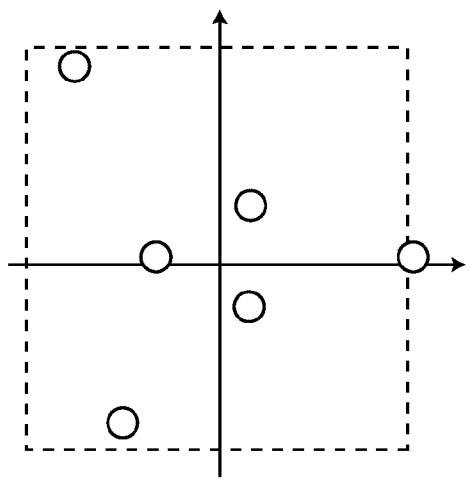
FIG. 4E is an example of a sensor array that is pseudo-random, planar, and optimized.

The spatial diversity of a sensor array can be optimized. Such optimization includes adjusting the orientations and/or baselines (or separations) of the sensors. FIG. 4E shows an example of an optimized pseudo-regular sensor array. Spatial diversity of a sensor array may be optimized by a multistep algorithm as follows:

Step 1. Start with a regular, irregular or random array with N sensors.

Step 2. If starting with a regular array, optionally distort the regular array slightly by assigning a different separation angle between each of the sensors on a circle such that all combinations of sensor pairs now have a unique angle relative to the x-axis.

Step 3. Order the sensor pairs according to angle, and associate each sensor pair with a desirable target angle that is equitably distributed on $[-\pi, +\pi]$ (any line through two points will have an angle in this range).

Step 4. Perform a nonlinear optimization that adjusts the positions of each sensor to minimize the squared residual of all receiver pair orientations with desired target receiver pair orientations.

Figure 6A:
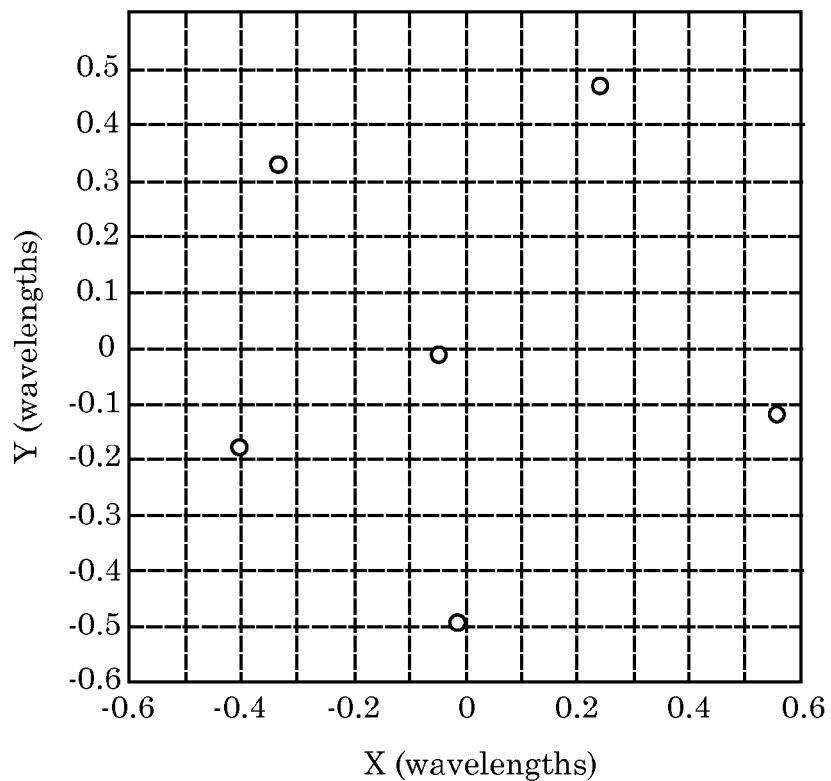
FIG. 6A is a plot of optimized sensor positions for a circular sensor array.
Figure 6B:
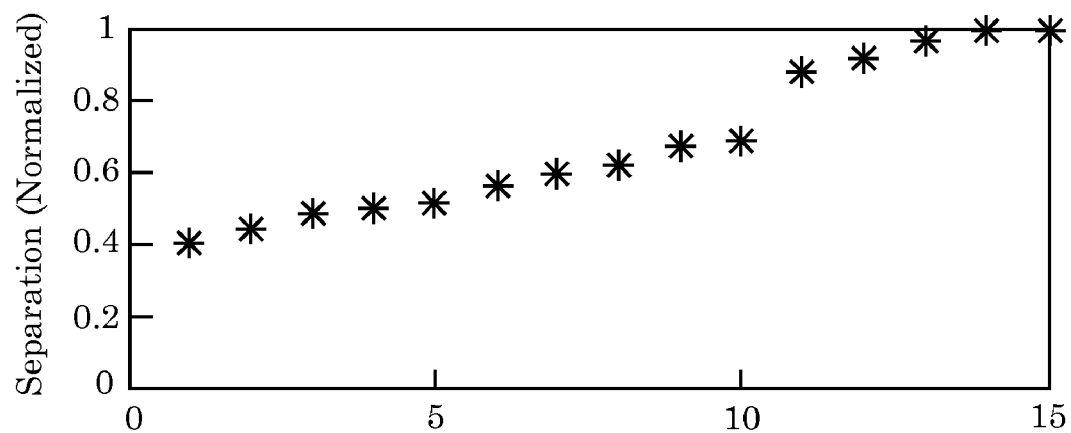
FIG. 6B is a plot of optimized sensor separations (or baselines) for a circular sensor array.
Figure 6C:
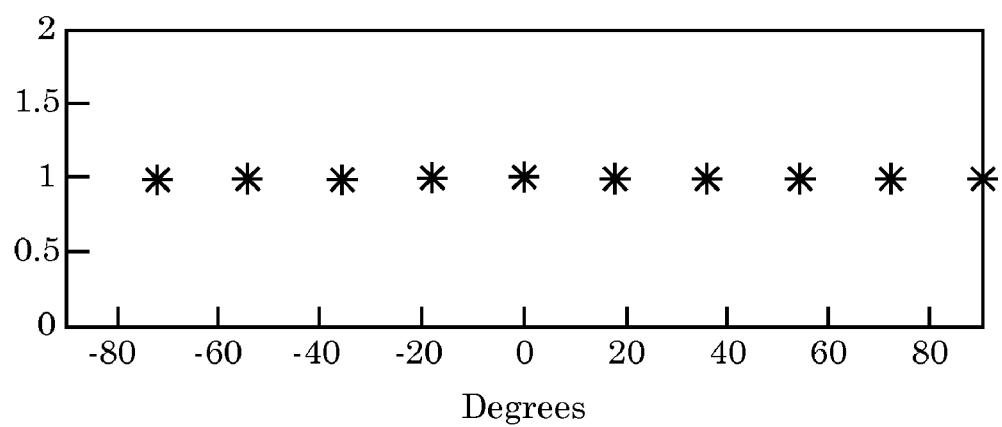
FIG. 6C is a plot showing distribution of azimuthal angles of receiver pairs.
Figure 6D:
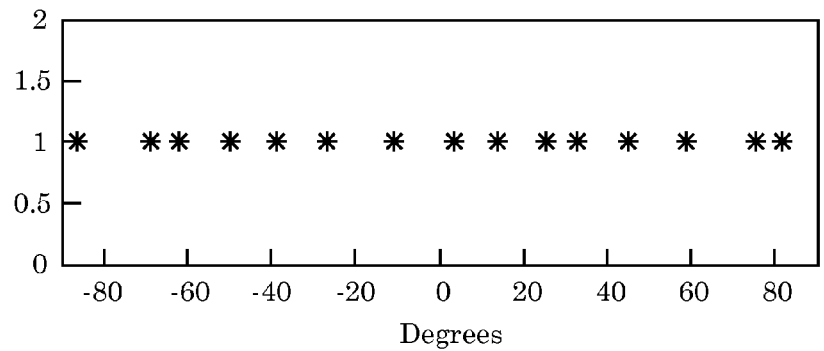
FIG. 6D is a plot showing optimized distribution of azimuthal angles of receiver pairs.

This optimization procedure could be similarly extended by adding a term to the objective function to encourage diversity in the baselines as well as diversity in orientation. In practice, diversity in baselines occurs naturally from implementing diversity in orientations. An optimized circular array generated using the algorithm above is shown in FIGS. 6A-6D. FIG. 6A and Table 1 below show the coordinates of the sensors in wavelengths. FIG. 6B shows the separations between the sensors. FIGS. 6C and 6D show the distribution of azimuthal angles for receiver pairs before and after optimization, respectively.

TABLE 1

| Sensor | X | Y |
|---|---|---|
| 1 | −0.0115 | −0.0018425 |
| 2 | 0.13411 | −0.028733 |
| 3 | 0.058249 | 0.11299 |
| 4 | −0.080129 | 0.079072 |
| 5 | −0.097307 | −0.043007 |
| 6 | −0.0034218 | −0.11848 |

Only with N>4 sensors can the phase difference array (9 in FIG. 3) employ spatial diversity to mitigate multipath interference. When N>4, the number M of unique receiver pairs that can be defined is given by:

$$M = \frac{N \times (N-1)}{2} \quad (3)$$

If N=6, as shown in FIG. 3, then 15 receiver channel pairs can be defined or 15 phase differences can be measured. For N receiver channels, there are N phases that are defined for a given frequency channel and a given instant of time. From these N phases, N-1 independent phase differences can be defined, with one of the N receivers acting as the reference receiver. If the reference receiver is labeled as 1, then the phase differences are:

$$\Delta\phi = \{\Delta\phi_{12}, \Delta\phi_{13}, \Delta\phi_{14}, \Delta\phi_{15}, \Delta\phi_{16}\} \quad (4)$$

where $$\Delta\phi_{ij} = \phi_j - \phi_i \quad (5)$$

It is possible to determine all the phase differences across the phase difference array from the N-1 phase differences (e.g., from equation (4)) using the fact that the sum of phase differences around any closed path in the phase difference array is zero. For a phase difference array with 6 sensors, phase differences can be calculated for any arbitrary receiver (or sensor) pair if the phase differences for the 5 receiver pairs are given. The calculation of all phase differences for the case of N=6 is shown below in equation (5a). Once all the phase differences across the phase difference array are calculated, any antenna sensor $A_i$ may be used as the reference sensor in the phase difference array when calculating position.

$$\begin{pmatrix} \Delta\varphi_{12} \\ \Delta\varphi_{13} \\ \Delta\varphi_{14} \\ \Delta\varphi_{15} \\ \Delta\varphi_{16} \\ \Delta\varphi_{23} \\ \Delta\varphi_{24} \\ \Delta\varphi_{25} \\ \Delta\varphi_{26} \\ \Delta\varphi_{34} \\ \Delta\varphi_{35} \\ \Delta\varphi_{36} \\ \Delta\varphi_{45} \\ \Delta\varphi_{46} \\ \Delta\varphi_{56} \end{pmatrix} = \begin{bmatrix} 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \\ -1 & 1 & 0 & 0 & 0 \\ -1 & 0 & 1 & 0 & 0 \\ -1 & 0 & 0 & 1 & 0 \\ -1 & 0 & 0 & 0 & 1 \\ 0 & -1 & 1 & 0 & 0 \\ 0 & -1 & 0 & 1 & 0 \\ 0 & -1 & 0 & 0 & 1 \\ 0 & 0 & -1 & 1 & 0 \\ 0 & 0 & -1 & 0 & 1 \\ 0 & 0 & 0 & -1 & 1 \end{bmatrix} \begin{pmatrix} \Delta\varphi_{12} \\ \Delta\varphi_{13} \\ \Delta\varphi_{14} \\ \Delta\varphi_{15} \\ \Delta\varphi_{16} \end{pmatrix} \quad (5a)$$

Frequency Diversity. Rician multipath models are used to provide a theoretical justification for the frequency diversity method employed in the present invention. Rician multipath reception is defined as the sum of direct line-of-sight (LOS) signal plus Rayleigh multipath signal. Rayleigh multipath reception is defined as the sum of a large number N of single multipath reflections. Such a sum can be written as:

$$A'_0 \exp(y) = A'_0 \exp(\omega t + \varphi'_0) = \sum_{i=1}^{N} \rho'_i \exp(\omega t + [\varphi'_i]_0) \quad (6)$$

where $[\phi'_i]_0$ denotes the i-th multipath phase relative to receiver 0 (the prime indicates multipath) and $\rho'_i$ is the amplitude of the i-th multipath. Equation (6) simply states that an arbitrary linear combination of signals with arbitrary amplitudes and phases can be summed to yield a total signal that can be characterized by one amplitude $A'_0$ and one phase $\phi'_0$.

Experimental measurements of the Rician K-factor, which is defined as the ratio of direct signal power to multipath signal power, for indoor line-of-sight environments indicates that the amplitude of the direct path is much greater than the amplitude of the multipath signal. The Rician K-factor typically ranges from 4 to 1000 (6 to 30 dB). This is an important observation supporting the utility of the PDA radio location system approach.

For Model 1, the behavior of multipath can be deduced using one pair of receivers where sensor 0 is the reference sensor and sensor 1 is the satellite sensor. The signal at sensor 0 is the sum of direct and multipath and is given by:

$$C_0 \exp j\beta_0 = A_0 \exp j(\omega t + \phi_0) + A'_0 \exp j(\omega t + \phi_0 + \phi'_0 - \phi_0) \quad (7)$$

An overall phase factor $\phi_0$ can be added to and subtracted from the multipath term so as to allow the total signal to be written in terms of a time-dependent phase factor, $x(t) = \omega t + \phi_0$, and a steady-state phase difference, $\phi'_0 - \phi_0$. In the phase difference array, time-dependent terms will cancel out.

Similarly, the signal at sensor 1 is given by:

$$C_1 \exp j\beta_1 = A_1 \exp j(\omega t + \phi_0 + \Delta\phi) + A'_1 \exp j(\omega t + \phi_0 + \phi'_0 - \phi_0 + \Delta\phi') \quad (8)$$

The amplitudes in Model 1 can be renormalized by dividing equations (7) and (8) by $A_0$ and $A_1$, respectively, and new amplitudes can be defined as:

$$b_0 = \frac{A'_0}{A_0} \quad (9)$$

$$b_1 = \frac{A'_1}{A_1} \quad (10)$$

The phase difference for Model 1 is derived from the definition of the phase angle of a complex number as follows:

$$X = \frac{C \exp j\beta_1}{C \exp j\beta_0} = \exp j(\beta_1 - \beta_0) \quad (11)$$

where the signals are normalized ($C = C_0 = C_1$).

The measured phase difference is given by:

$$\beta_1 - \beta_0 = \Delta\beta_{10} = \tan^{-1}\left[\frac{Im(x)}{Re(x)}\right] = \tan^{-1}\left(\frac{T_1}{T_2}\right) \quad (12)$$

where $$T_1 = \sin(\Delta\phi) - b_0 \sin(\phi'_0 - \phi_0)\cos(\Delta\phi) + b_0 \cos(\phi'_0 - \phi_0)\sin(\Delta\phi) + b_1 \sin(\phi'_0 - \phi_0 + \Delta\phi') + b_0 b_1 \sin(\Delta\phi') \quad (13a)$$

$$T_2 = \cos(\Delta\phi) + b_0 \cos(\phi'_0 - \phi_0)\cos(\Delta\phi) + b_0 \sin(\phi'_0 - \phi_0)\sin(\Delta\phi) + b_1 \cos(\phi'_0 - \phi_0 + \Delta\phi') + b_0 b_1 \cos(\Delta\phi') \quad (13b)$$

In the limit $b_0$, $b_1 = 0$ (no multipath), the following is true:

$$\tan(\Delta\beta_{10}) \to \tan(\Delta\phi) \quad (14)$$

In the limit $b_0$, $b_1 \gg 1$, the following is true:

$$\tan(\Delta\beta_0) \to \frac{b_0 b_1 \sin(\Delta\varphi')}{b_0 b_1 \cos(\Delta\varphi')} = \tan(\Delta\varphi') \quad (15)$$

The $\Delta\phi'$ in equation (14) is the phase difference due to the direct signal alone. The $\Delta\phi'$ in equation (15) is the phase difference due to multipath alone. Thus, Model 1 interpolates between the phase difference due to the direct signal, $\Delta\phi$, and the phase difference due to the multipath signal, $\Delta\phi'$.

For Model 2, another expression may be derived for the phase difference using a trigonometric identity for adding phases. To calculate the phase difference in the presence of a multipath signal, the following identify is used:

$$a \exp jz + b \exp j(z+a) = c \exp j(z+\beta) \quad (16)$$

where $$c = \sqrt{a^2 + b^2 + 2ab\cos a} \quad (17)$$

$$\beta = \text{atan2}(b \sin a, a + b \cos a) \quad (18)$$

and $\beta$ is defined on the range $[-\pi, +\pi]$.

The derivation proceeds as before with the sum of a direct signal and one multipath signal. Let the following expression be the time dependence and phase of the direct signal:

$$x = \omega t + \phi_0 \quad (19)$$

Similarly, let the following expression be the time dependence and phase of the multipath signal:

$$y = \omega t + \phi'_0 \quad (20)$$

Adding $\phi_0$ and subtracting $\phi_0$ in equation (20) yields:

$$y = \omega t + \phi_0 - \phi_0 + \phi'_0 \quad (21)$$

Substituting equation (19) into equation (21) yields:

$$y = x + \phi'_0 - \phi_0 \quad (22)$$

The trick of adding $\phi_0$ and subtracting $\phi_0$ in equation (20) allows y to be rewritten as a sum of x (a time-dependent part) and a phase difference $\phi'_0 - \phi_0$ (a time-independent part) in equation (22).

The signal received on receiver 0 can then be written as:

$$S_0 = A_0 \exp x + A'_0 \exp y \quad (23)$$

Substituting equation (22) in equation (23) yields:

$$S_0 = A_0 \exp x + A'_0 \exp(x + \phi'_0 - \phi_0) \quad (24)$$

Similarly, the signal received on receiver 1 is given by:

$$S_1 = A_1 \exp(x + \Delta\phi) + A'_1 \exp(y + \Delta\phi') \quad (25)$$

Substituting equation (22) into equation (25) yields:

$$S_1 = A_1 \exp(x + \Delta\phi) + A'_1 \exp(x + \phi'_0 - \phi_0 + \Delta\phi') \quad (26)$$

Adding $\Delta\phi_0$ and subtracting $\Delta\phi_0$ in the second exponential term in equation (26) yields:

$$S_1 = A_1 \exp(x + \Delta\phi) + A'_1 \exp(x + \Delta\phi + \phi'_0 - \phi_0 + \Delta\phi' - \Delta\phi) \quad (27)$$

Let $z = x + \Delta\phi$. Then, equation (27) can be rewritten as:

$$S_1 = A_1 \exp(z) + A'_1 \exp(z + \phi'_0 - \phi_0 + \Delta\phi' - \Delta\phi) \quad (28)$$

In equation (28), $\Delta\phi$ is the phase difference signal due to the direct path. $\Delta\phi'$ is the phase difference signal due to multipath reflections. The quantity $\phi'_0 - \phi_0$ is a generalized phase difference that will be seen to characterize the oscillation of the phase difference with frequency. Applying the trigonometric identity to equations (24) and (28), the following expressions can be written:

$$S_0 = C_0 \exp(x + \beta_0) \quad (29)$$

$$S_1 = C_1 \exp(x + \beta_1) \quad (30)$$

where $$\beta_0 = \text{atan 2}[b_0 \sin(\phi'_0 - \phi_0), 1 + b_0 \cos(\phi'_0 - \phi_0)] \quad (31)$$

$$\beta_1 = \Delta\phi + \text{atan 2}[b_1 \sin(\phi'_0 - \phi_0 + \Delta\phi' - \Delta\phi), 1 + b_1 \cos(\phi'_0 - \phi_0 + \Delta\phi' - \Delta\phi)] \quad (32)$$

From equations (31) and (32), the phase difference signal in the presence of multipath is:

$$\beta_1 - \beta_0 = \Delta\phi + \text{atan 2}[b_1 \sin(\phi'_0 - \phi_0 + \Delta\phi' - \Delta\phi), 1 + b_1 \cos(\phi'_0 - \phi_0 + \Delta\phi' - \Delta\phi)] - \text{atan 2}[b_0 \sin(\phi'_0 - \phi_0), 1 + b_0 \cos(\phi'_0 - \phi_0)] \quad (33)$$

In the limit $b_0$, $b_1 = 0$ (no multipath), the following is true:

$$\beta_1 - \beta_0 \to \Delta\phi \quad (34)$$

Applying the limit $b_0$, $b_1 \gg 1$ to equation (33) yields:

$$\beta_1 - \beta_0 \approx \Delta\phi + \text{atan 2}[\sin(\phi'_0 - \phi_0 + \Delta\phi' - \Delta\phi), \cos(\phi'_0 - \phi_0 + \Delta\phi' - \Delta\phi)] - \text{atan 2}[\sin(\phi'_0 - \phi_0), \cos(\phi'_0 - \phi_0)] \quad (35)$$

Equation (35) can be further simplified as follows:

$$\beta_1 - \beta_0 \approx \Delta\phi + (\phi'_0 - \phi_0 + \Delta\phi' - \Delta\phi) - (\phi'_0 - \phi_0) \quad (36)$$

Finally, $$\beta_1 - \beta_0 \approx \Delta\phi' \quad (37)$$

Equation (37) for Model 2 agrees with equation (15) for Model 1, and equation (34) for Model 2 agrees with equation (14) for Model 1. The calculations above show that both models interpolate correctly between the direct signal (no multipath signal) and the multipath signal (no direct signal). Model 1 and Model 2 are thus equivalent. Model 2 predicts that the slope of the phase differences as a function of frequency is a constant with a frequency dependent oscillation superposed upon the data.

The functional behaviors of Model 1 and Model 2 allow derivation of some important properties that are key to the function of the phase difference array. The following property can be defined:

$$F(b;x) = \text{atan } 2[b\sin x, 1+b\cos x] \approx b \sin x \quad (38)$$

Equation (38) is a function with oscillatory behavior and has a zero integral. Taking the derivative of F(x) yields the following:

$$F'(b;x) = \frac{\frac{b\cos x}{1+b\cos x} + \left(\frac{b\sin x}{1+b\cos x}\right)^2}{1+\left(\frac{b\sin x}{1+b\cos x}\right)^2} \approx b\cos x \quad (39)$$

The phases and phase differences are linear functions of frequency with a zero intercept at zero frequency. The function F'(b;x) is a modulation function in frequency. The integral of F'(b;x) over an integral number of periods of this function is zero.

The derivative of $\Delta\beta$ as a function of frequency is:

$$\frac{d\Delta\beta}{df} = (1 - F'(b_1; \varphi' - \varphi + \Delta\varphi' - \Delta\varphi)) \cdot \frac{d\Delta\varphi}{df} + \quad (40)$$
$$F'(b_1; \varphi' - \varphi + \Delta\varphi' - \Delta\varphi) \cdot$$
$$\frac{d\Delta\varphi'}{df} + [F'(b_1; \varphi' - \varphi + \Delta\varphi' - \Delta\varphi) - F'(b_0; \varphi' - \varphi)] \cdot \frac{d(\varphi' - \varphi)}{df}$$

All the derivatives (with respect to frequency) of phases and phase differences are constants. The last term in equation (40) is the product of a large time delay due to the path length differences between the line-of-sight signal and the multipath signal. This product is a frequency dependent modulation function that is the difference between two similar functions. The first two terms in equation (40) are expressed in the form of an interpolation between the direct phase difference signal and the multipath phase difference signal and depends only on $b_1$.

Although the present invention may be applied to any radio band, the operative frequencies for a prototypical application are envisaged in the GHz range, where the bandwidth of a given frequency channel is typically 100 KHz to 1 MHz. For example, the 79 channels used by Bluetooth in the ISM band at 2.4 GHz have 1 MHz bandwidth per channel and span 79 MHz of the ISM radio band ranging from 2.402 to 2.480 GHz.

Over a sufficiently large range of frequencies, the function in equation (39) above is oscillatory, with a zero integral. However, it is possible for the integral of the function in equation (39) to be non-zero over a shorter range of frequencies. If so, Model 1 and Model 2 described above can be the basis for separating the direct and multipath signals, i.e., by adjusting phase difference slopes for the end effects of finite ranges of measured phase differences. Over a sufficiently wide range of frequencies, an unbiased estimate of the required phase difference is simply given by the best straight line through the data (with zero intercept). This is the general principle underlying what is defined here as the "frequency diversity" of the phase difference array. The simplest embodiment of exploiting the frequency diversity of the PDA radio location system is therefore the calculation of phase slopes in step 75 of FIG. 11 to determine the TDOA values used to determine position.

Time Diversity. The steady-state phase differences measured across receiver pairs can be sampled using analog-to-digital converters with a wide range of sampling frequencies. For example, a window of 500 microseconds of data acquisition at 100 Ksps will yield 50 samples of phase difference at one hop frequency for a single Bluetooth radio channel. This data sample will provide additional noise reduction and increased accuracy by averaging over data samples if the data is distributed according to a Gaussian probability density function. In this respect, this can be viewed of as a means of exploiting time diversity of the phase difference signal, and the method of mitigating error is simply the calculation of the mean and standard deviation of the data acquired for the given channel. Time diversity therefore provides the theoretical foundation for step 57 of FIG. 10.

Phase Unwrapping. The phase unwrapping algorithms are very important routines for estimation of position with a phase difference array. Determining the correct phase differences in the presence of phase wrapping errors with PDAs can exploit three levels of phase consistency (or phase continuity): (1) internal consistency of phase differences within the frequency band of interest to determine a reliable slope; (2) external consistency of the phase slope across a frequency band with a zero intercept at zero frequency; and (3) overall consistency of phase slopes between receiver pairs across the entire phase difference array. At each level, the requirement that the phase differences be self-consistent is used to determine the absolute phase of the direct path signals. Each additional level of self-consistency checks decreases the probability of a phase wrapping error. In particular, spatial diversity of the PDA provides a third level of consistency checking of phase unwrapping that would not otherwise be available. The reduced probability of phase wrapping errors is a factor that increases the overall accuracy of the reported position.

Figure 7A:
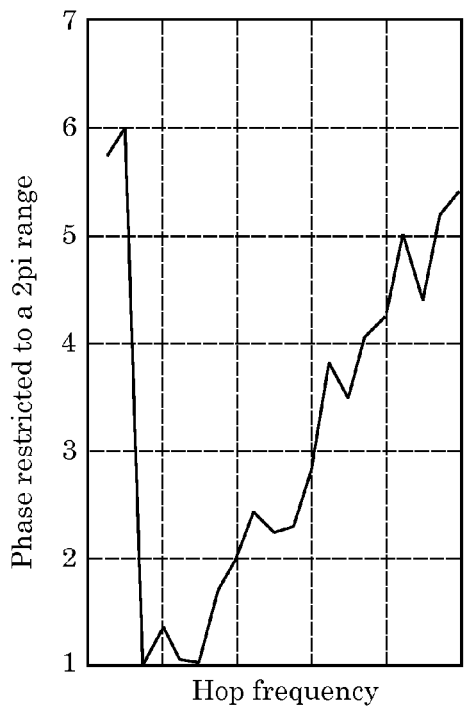
FIG. 7A is a plot of phase versus frequency with phase wrap at the left boundary.
Figure 7B:
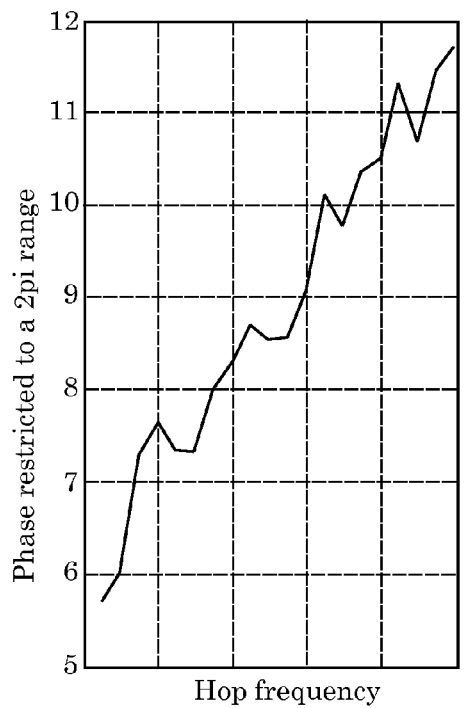
FIG. 7B is a plot of phase versus frequency after applying a first level of phase unwrapping to the data of FIG. 7A.

One of the unique aspects of the phase difference approach is the measurement of phase differences as a function of frequency, and it is this analysis of phase differences versus frequency that provides the first level of phase unwrapping. In the first level of phase unwrapping, the measured phase differences are limited to the range $[-\pi, +\pi]$ and are called the principal values of the phase differences. At this level of analysis, internal consistency of the phase differences may be obtained by observing discontinuities in the phase differences as a function of frequency, which in the Rician Multipath Model exhibits continuous oscillatory behavior in the presence of multipath interference (see equation (39)). FIG. 7A shows phase wrapping at a boundary of a phase versus frequency plot. FIG. 7B shows phase unwrapping of the plot of FIG. 7A. The first level of phase unwrapping is used in step 73 of FIG. 11.

Figure 8:
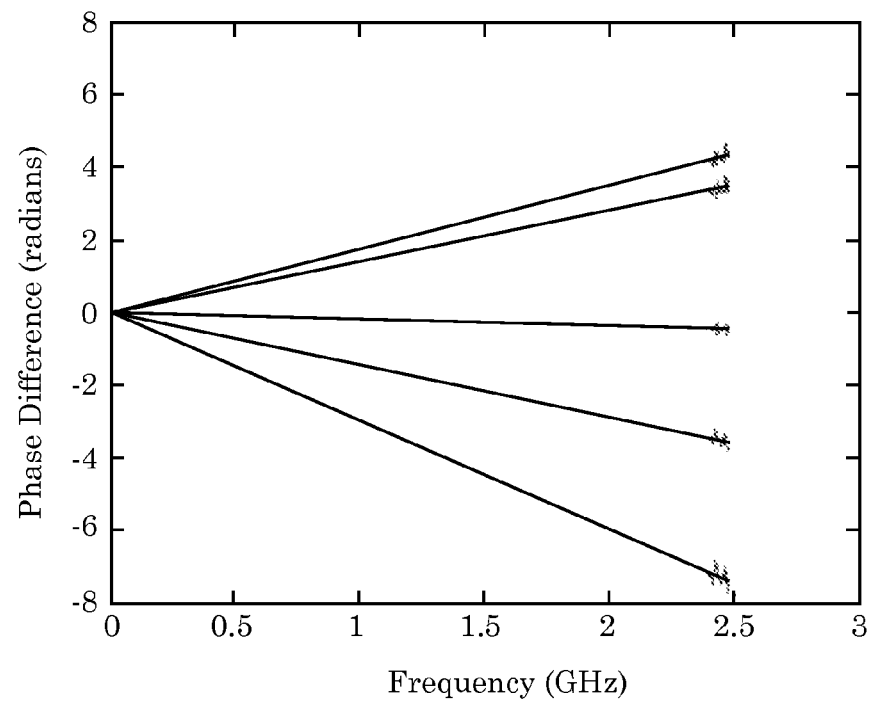
FIG. 8 is a series of phase difference versus frequency plots after applying a second level of phase unwrapping to a phase difference data.

The slope of each phase difference versus frequency plot is the best straight line fit through the phase difference versus frequency data. The second level of phase unwrapping incorporates the condition that the slope of each phase difference versus frequency plot must have a zero intercept at zero frequency (see FIG. 8. Note that the difference between the data in the plots and the straight line through the data is magnified by 10× to enhance clarity). Factors of $2\pi$ are added to or subtracted from the phase differences as required to achieve the best overall consistency with this condition. Consistency is measured as being the smallest sum of squared deviations of the observed data with a best straight line fit with zero intercept. At the high frequencies used in the ISM band at 2.4 GHz, for example, the range of frequencies available in this band is relatively small (<100 MHz) compared with the "lever arm" of the band itself (2.4 GHz). Hence, at this second level of phase unwrapping, phase unwrapping errors can still occur. The second level of phase unwrapping is used in step 75 of FIG. 11.

The third level of phase unwrapping imposes overall consistency of phase differences across all the different receiver pairs in the phase difference array. The present approach is to iterate towards a self-consistent solution by imposing consistency of phase differences across the array prior to performing a least squares determination of the transmitter position. The idea is that, given an approximate location of the client device (X', Y', Z'), the expected path differences may be calculated and compared with the measured path differences. A phase unwrapping error can introduce a path difference error of about 125 millimeters (one wavelength at 2.4 GHz), where the estimated path difference error based on an approximate location of the client will be measured to be typically less than a few 10s of millimeters. Phase unwrapping errors can be immediately detected and corrected, and the slopes of the phase difference plots can then be recalculated based on the revised data. The revised data is then used to determine the position of the client, typically with some degradation to the overall accuracy. A drawback of this approach is that the dependence of the phase unwrapping on the position of the transmitter introduces the chance of the algorithm failing to converge. This failure to converge is mitigated significantly if a robust estimate of the approximate transmitter position can be obtained despite the presence of both multipath interference and phase unwrapping errors. Robust estimation of approximate position is addressed in more detail below. The third level of phase unwrapping outlined above is used in step 83 of FIG. 11.

Position Determination. The slope of a plot of phase differences $\Delta\phi_{ij}$ as a function of frequency yields time differences of arrival (TDOAs) $\Delta t_{ij}$ for each receiver pair across the phase difference array. These differences are equivalent to path differences $d_{ij}$ across the phase difference array, using the relationship:

$$d_{ij} = c \Delta t_{ij} \tag{41}$$

where c is the speed of light, index i refers to the reference sensor, and index j indicates a satellite sensor. Once TDOAs are converted to path differences, the position of the transmitter of the client device may be calculated using several algorithms. Below, the position of the transmitter of the client device from the curvature of a spherical wavefront as the transmitter interacts with the individual sensors in the phase difference array is described.

The absolute position of the transmitter of the client device is defined as (X,Y,Z) in the coordinate system that is chosen, and the position of the i-th sensor is $(x_i, y_i, z_i)$. For planar arrays, the z coordinates of the sensors are defined to be zero. The "phase" of the spherical wavefront at the i-th sensor (in the following discussion, phases are expressed in units of meters rather than radians) is defined as $\delta_i$, with an overall arbitrary phase constant defined to be zero at the origin of the coordinate system. The origin of the coordinate system is typically the center of the array. In this coordinate system, the distance (or range) D from the center of the PDA to the client transmitter is defined in terms of the position of the transmitter as:

$$D^2 = X^2 + Y^2 + Z^2 \tag{42}$$

For the i-th sensor, the range from the transmitter to the sensor is:

$$(D - \delta_i)^2 = (X - x_i)^2 + (Y - y_i)^2 + Z^2 \tag{43}$$

Expanding and subtracting each of these sensor range equations from the range equation at the origin eliminates the quadratic terms D, X, Y, and Z, yielding N equations for i=1 . . . N:

$$2\delta_i D - 2x_i X - 2y_i Y + x_i^2 + y_i^2 - \delta_i^2 = 0 \tag{44}$$

The phases in these equations are expressed as path differences in units of meters or, alternately, wavelengths. However, the phases are not directly observed, only the phase differences. An antisymmetric matrix of path differences can be defined as follows:

$$d_{ij} = \delta_j - \delta_i \tag{45}$$

where i denotes the reference sensor and j denotes the satellite sensor. If the range equation for the i-th sensor is subtracted from the range equation for the satellite sensor j, the following expression is obtained:

$$F_{ij} = 2d_{ij}D - 2(x_j - x_i)X - 2(y_j - y_i)Y + (x_j^2 - x_i^2) + (y_j^2 - y_i^2) - (\delta_j^2 - \delta_i^2) = 0 \tag{46}$$

The difference of squared phases can be written in terms of observable phase differences and unobservable phases as:

$$\delta_j^2 - \delta_i^2 = (\delta_j - \delta_i) \cdot (\delta_j + \delta_i) = d_{ij} \cdot (\delta_j + \delta_i) \tag{47}$$

Although the phases are not directly measured, they can be rewritten in terms of the solution as:

$$\delta_i = D - D_i \tag{48}$$

$$\delta_j = D - D_j \tag{49}$$

where $$D_i = \sqrt{(X - x_i)^2 + (Y - y_i)^2 + Z^2} \tag{50}$$

$$D_j = \sqrt{(X - x_j)^2 + (Y - y_j)^2 + Z^2} \tag{51}$$

In equations (46), (50), and (51), planar array is assumed, with all sensors having $z_i = 0$. Substituting for the phases in equation (46), all dependence of the position equations on D cancels out to obtain:

$$F_{ij} = 2d_{ij}(D_i + D_j) - 2(x_j - x_i)X - 2(y_j - y_i)Y + (x_j^2 - x_i^2) + (y_j^2 - y_i^2) + 0 \tag{52}$$

The usefulness of Equation (52) is that it has explicitly linear terms in X and Y and is quasi-linear in X and Y and Z through the definitions of $D_i$ and $D_j$. There are a number of different algebraic approaches to deriving alternate position equations that provide the "same" answers but with different levels of accuracy in practice. In fact, it is possible to derive position equations (the so-called multilateration equations) that are fully linear in X, Y and Z, with a reduction in the level of redundancy across the array. Although theoretically equivalent, different formulas will generally have different sensitivity to errors in the measured phase differences. Equation (52) was found to have acceptable error properties. Equation (52) can be solved using a generalized form of the Newton-Raphson method or, alternately, by summing the squares of these equations—a non-linear least squares minimization algorithm such as the Levenberg-Marquardt algorithm may be employed. The Newton-Raphson method is described below.

The derivatives of the F matrix with respect to the transmitter position are given by the equations:

$$(J_{ij})_1 = \frac{\partial F_{ij}}{\partial X} = d_{ij}\left(\frac{\partial D_i}{\partial X} + \frac{\partial D_j}{\partial X}\right) - 2(x_j - x_i) \tag{53}$$

-continued $$(J_{ij})_2 = \frac{\partial F_{ij}}{\partial Y} = d_{ij}\left(\frac{\partial D_i}{\partial Y} + \frac{\partial D_j}{\partial Y}\right) - 2(y_j - y_i) \quad (54)$$

$$(J_{ij})_3 = \frac{\partial F_{ij}}{\partial Z} = d_{ij}\left(\frac{\partial D_i}{\partial Z} + \frac{\partial D_j}{\partial Z}\right) \text{ where} \quad (55)$$

$$\frac{\partial D_i}{\partial X} = \frac{(X - x_i)}{D_i} \quad (56)$$

$$\frac{\partial D_i}{\partial Y} = \frac{(Y - y_i)}{D_i} \quad (57)$$

$$\frac{\partial D_i}{\partial Z} = \frac{Z}{D_i} \quad (58)$$

$$\frac{\partial D_j}{\partial X} = \frac{(X - x_j)}{D_j} \quad (59)$$

$$\frac{\partial D_j}{\partial Y} = \frac{(Y - y_j)}{D_j} \quad (60)$$

$$\frac{\partial D_j}{\partial Z} = \frac{Z}{D_j} \quad (61)$$

$F_{ij}$ can be ordered as a row vector of length NC2=N!/(N−2)!2!)—for each i, cycle over j>i, and compile the elements in turn. For N=6, there are 15 elements. For N=7, there are 21 elements. Consider N=5, then the row vector is given as:

$$F = \{F_{12}, F_{13}, F_{14}, F_{15}, F_{23}, F_{24}, F_{25}, F_{35}, F_{45}\} \quad (62)$$

The corresponding derivatives can be written as a matrix of J of NC2 rows of 3 derivatives of $F_{ij}$ with respect to X, Y, and Z, respectively. For N=5, the matrix is given as:

$$J = \begin{bmatrix} \frac{\partial F_{12}}{\partial X} & \frac{\partial F_{12}}{\partial Y} & \frac{\partial F_{12}}{\partial Z} \\ \frac{\partial F_{13}}{\partial X} & \frac{\partial F_{13}}{\partial Y} & \frac{\partial F_{13}}{\partial Z} \\ \frac{\partial F_{14}}{\partial X} & \frac{\partial F_{14}}{\partial Y} & \frac{\partial F_{14}}{\partial Z} \\ \frac{\partial F_{15}}{\partial X} & \frac{\partial F_{15}}{\partial Y} & \frac{\partial F_{15}}{\partial Z} \\ \frac{\partial F_{23}}{\partial X} & \frac{\partial F_{23}}{\partial Y} & \frac{\partial F_{23}}{\partial Z} \\ \frac{\partial F_{24}}{\partial X} & \frac{\partial F_{24}}{\partial Y} & \frac{\partial F_{24}}{\partial Z} \\ \frac{\partial F_{25}}{\partial X} & \frac{\partial F_{25}}{\partial Y} & \frac{\partial F_{25}}{\partial Z} \\ \frac{\partial F_{34}}{\partial X} & \frac{\partial F_{34}}{\partial Y} & \frac{\partial F_{34}}{\partial Z} \\ \frac{\partial F_{35}}{\partial X} & \frac{\partial F_{35}}{\partial Y} & \frac{\partial F_{35}}{\partial Z} \\ \frac{\partial F_{45}}{\partial X} & \frac{\partial F_{45}}{\partial Y} & \frac{\partial F_{45}}{\partial Z} \end{bmatrix} \quad (63)$$

With this formulation, the so-called 3×3 curvature matrix A and vector b can be constructed:

$$A = \frac{1}{2} J^T J \quad (64)$$

$$b = -\frac{1}{2}(FJ)^T \quad (65)$$

Figure 9:
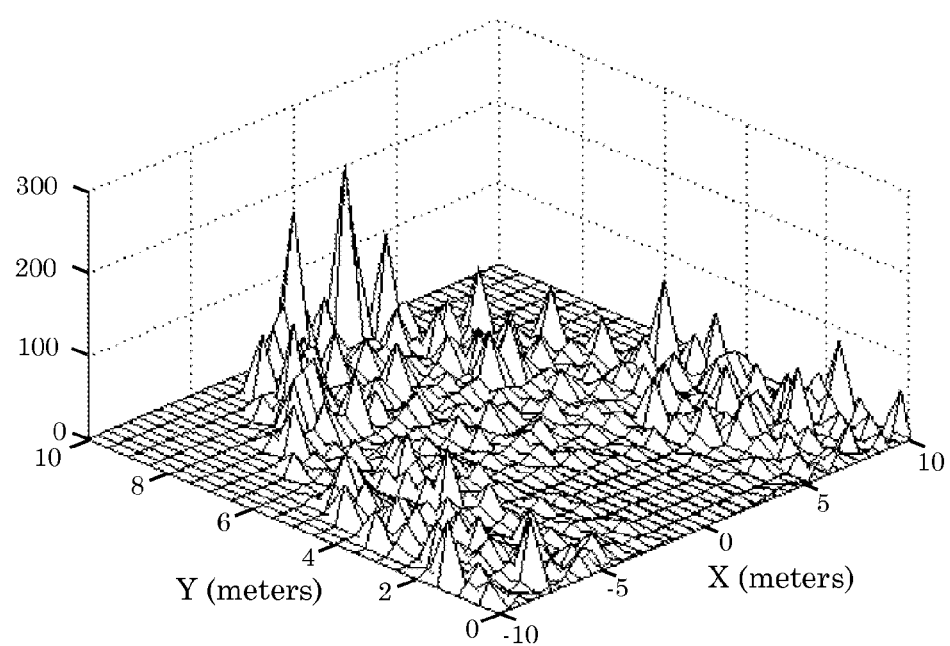
FIG. 9 shows a plot of absolute error when using Newton-Raphson method to determine position.

Solving the system of linear equations AΔP=b provides values ΔP=(ΔX, ΔY, ΔZ), which can be used to iteratively refine the position of the transmitter given an initial estimate or guess. FIG. 9 is a simulated two-dimensional error distribution for the positioning equations outlined above for a single sample period for a surveillance volume of 21 m×21 m×8 m, reflection coefficient of 0.01, and range less than 10 m.

Although the position determination approach has been expressed in terms of Cartesian coordinates X, Y, Z, it is sometimes desirable to express the position equations in spherical or cylindrical coordinates, depending on the application. In particular, a spherical coordinate implementation has the advantage of being expressible in terms of an algorithm for determining the bearing angles (or elevation and azimuthal angles) of the client device that is not sensitive to phase unwrapping errors (described below). In this case, the position determination problem can be factored into a two-dimensional bearing angle calculation and a one-dimensional range calculation. Expressing the position equations in spherical coordinates for example provides for orthogonal coordinates where one of the coordinates (the range) is inversely proportional to the curvature of the spherical wavefront. This formulation provides a natural framework for the positioning problem.

Bearing Angle Estimation. A bearing angle calculation is very robust in the presence of multipath when a complex weighting is used between receiver pairs. This calculation is given below. The fact that the phase difference array can provide a very robust measurement of bearing angle directly is very important. This calculation provides the independent input needed for the third level of phase unwrapping, prior to numerically solving the position equations for the client position. This bearing angle approach may also be used as the method of choice for positioning equations expressed in polar or cylindrical coordinates. The utility of this bearing angle calculation is that the use of complex weights is not sensitive to phase unwrapping errors as the weights themselves are wrapped quantities (complex exponentials can be expressed as the sum of sine and cosine functions, which are periodic in their arguments).

Let X, Y, Z be the client position, $x_i$, $y_i$, $z_i$ the position of an arbitrary reference sensor, and $x_j$, $y_j$, $z_j$ the position of a satellite sensor. Recall that:

$$D_i^2 = (X - x_i)^2 + (Y - y_i)^2 + (Z - z_i)^2 \quad (66)$$

$$D_j^2 = (X - x_j)^2 + (Y - y_j)^2 + (Z - z_j)^2 \quad (67)$$

$$D^2 = X^2 + Y^2 + Z^2 \quad (68)$$

The position of the client in polar coordinates relative to the reference sensor can be defined as:

$$X = D_i \sin\theta \cos\phi + x_i \quad (69)$$

$$Y = D_i \sin\theta \sin\phi + y_i \quad (70)$$

$$Z = D_i \cos\theta + z_i \quad (71)$$

Consider a far field approximation of a signal arriving at two (or more) sensors in a line. The arrival phase at the reference sensor is $e^{jkD_i}$ and at the satellite sensor $e^{jkD_i + jk(D_j - D_i)}$ (k is the wave vector magnitude, defined as k=2π/λ). The beam pattern is:

$$B = \left| e^{jkD_i} \left\{ 1 + \sum_{1}^{N} \exp(jk(D_j - D_i)) \right\} \right| \quad (72)$$

If $(D_j-D_i)_S$ is the value of $(D_j-D_i)$ for the client position and $(D_j-D_i)_E$ is the value of $(D_j-D_i)$ for any other position, then the steered beam pattern is:

$$B = \left| 1 + \sum_{1}^{N} \exp\{jk[(D_j - D_i)_S + (D_i - D_j)_E]\} \right| \quad (73)$$

Expanding $D_i$ and $D_j$ in the far field and ignoring small terms, $$D_i = D - (x_i \sin\theta\cos\varphi + y_i \sin\theta\sin\varphi + z_i \cos\theta) \quad (73)$$

$$D_j = D - (x_j \sin\theta\cos\varphi + y_j \sin\theta\sin\varphi + z_j \cos\theta) \quad (74)$$

So that, $$D_i - D_j = (x_j - x_i)\sin\theta\cos\varphi + (y_j - y_i)\sin\theta\sin\varphi + (z_j - z_i)\cos\theta \quad (75)$$

If all the sensors are in the xy plane, $z_j - z_i = 0$, then the steered beam becomes:

$$B(\theta, \varphi, \theta_S, \varphi_S) = \quad (76)$$

$$\left| 1 + \sum_{1}^{N} \exp\left\{ \begin{array}{l} jk[(x_j - x_i)\sin\theta\cos\varphi - \sin\theta_S\cos\varphi_S + \\ (y_j - y_i)(\sin\theta\sin\varphi - \sin\theta_S\sin\varphi_S)] \end{array} \right\} \right|$$

If we say that $\delta_{ij}$ is the measured phase difference at one hop frequency between the two sensors and that $(x_j-x_i)=\Delta x$ and $(y_j-y_i)=\Delta y$, then $$B(\theta, \varphi) = \left| 1 + \sum_{1}^{N} \exp\{j[\delta_{ij} + k(\Delta x \sin\theta\cos\varphi + \Delta y \sin\theta\sin\varphi)]\} \right| \quad (76)$$

The algorithm proceeds such that when $\varphi$ and $\theta$ are modified, and when B is at a maximum, $\varphi = \varphi_s$ and $\theta = \theta_S$ are the bearing angles of the client device. The utility of this expression is that the phase differences need not be phase unwrapped, as the expression is periodic in the wave vector k. Thus, an algorithm that maximizes B as a function of bearing angles provides a robust starting point for a precise determination of position if the range is taken to be an intermediate value in the far field of the array. With this choice, convergence of the positioning algorithms is robust.

Figure 10:
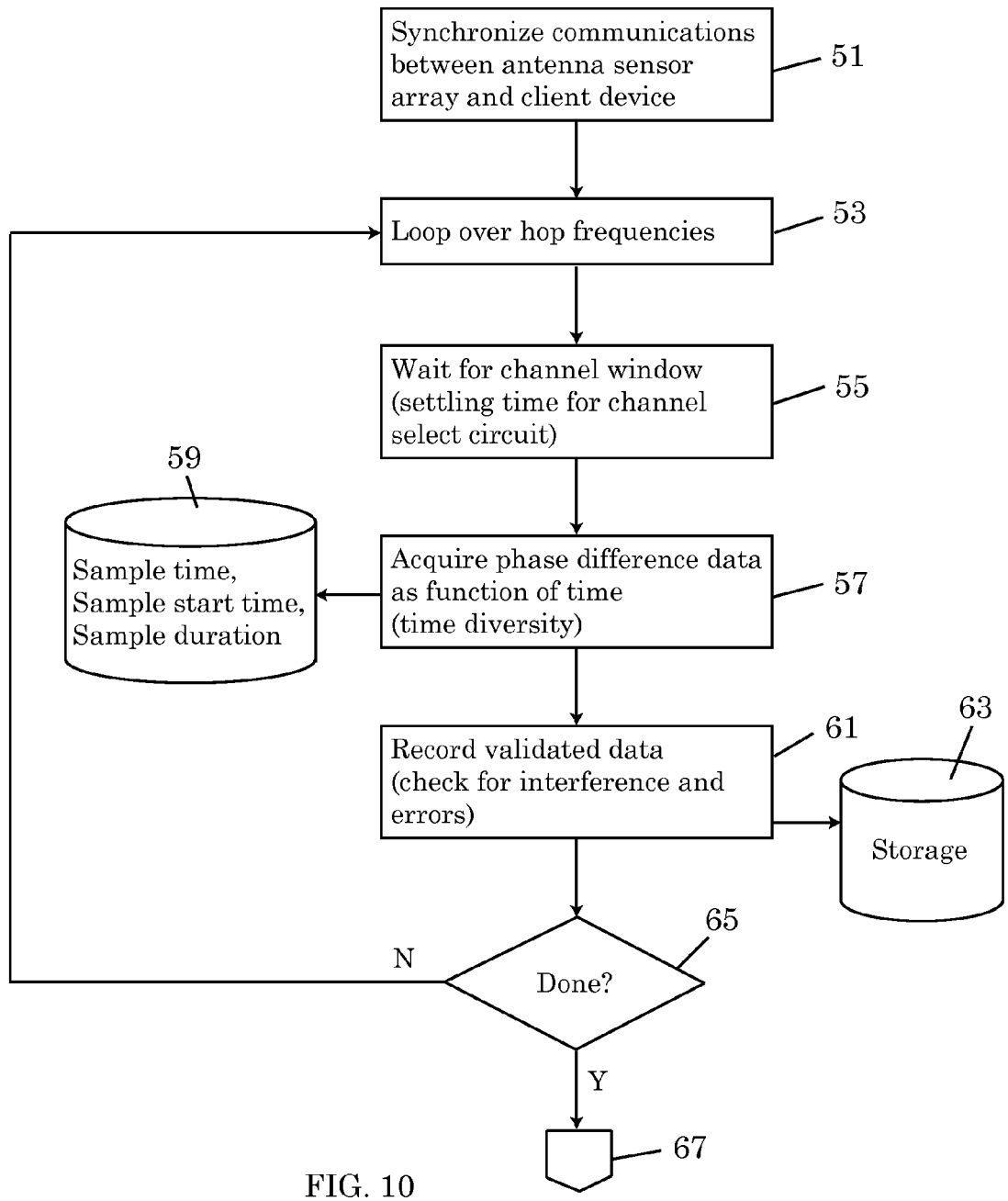
FIG. 10 is a flowchart illustrating a data acquisition portion of a method for determining the position of a client device within a surveillance volume according to one embodiment of the present invention.

FIG. 10 is a flowchart of the data acquisition portion of a method for determining the position of the client device (1 in FIG. 1) within a surveillance volume (3 in FIG. 1) according to one embodiment of the invention. In the embodiment shown in FIG. 10, communications are synchronized between the spatially diverse phase difference array (9 in FIG. 1) and the client device (1 in FIG. 1) (51). The baseband processor selects a hop frequency from a range of hop frequencies (53). For the selected hop frequency, the baseband processor (23 in FIG. 2) waits for the channel window to settle (55). The baseband processor then acquires phase difference data as a function of time from the phase difference array (9 in FIG. 3) (57). The baseband processor provides sample time, sample start time, and sample duration time as inputs to the phase difference array (59). The phase difference data is recorded in storage 63 (e.g., memory 31 in FIG. 2) and checked for interference errors (61). The baseband processor checks to see if the last hop frequency in the range of hop frequencies has been selected (65). If not, the method loops back to step 53 and repeats the process for another hop frequency. When all the desired hop frequencies have been selected, the data acquisition portion is complete (67). The data stored in storage 63 includes phase differences as a function of time for each hop frequency. Next is the signal processing portion of the method.

Figure 11:
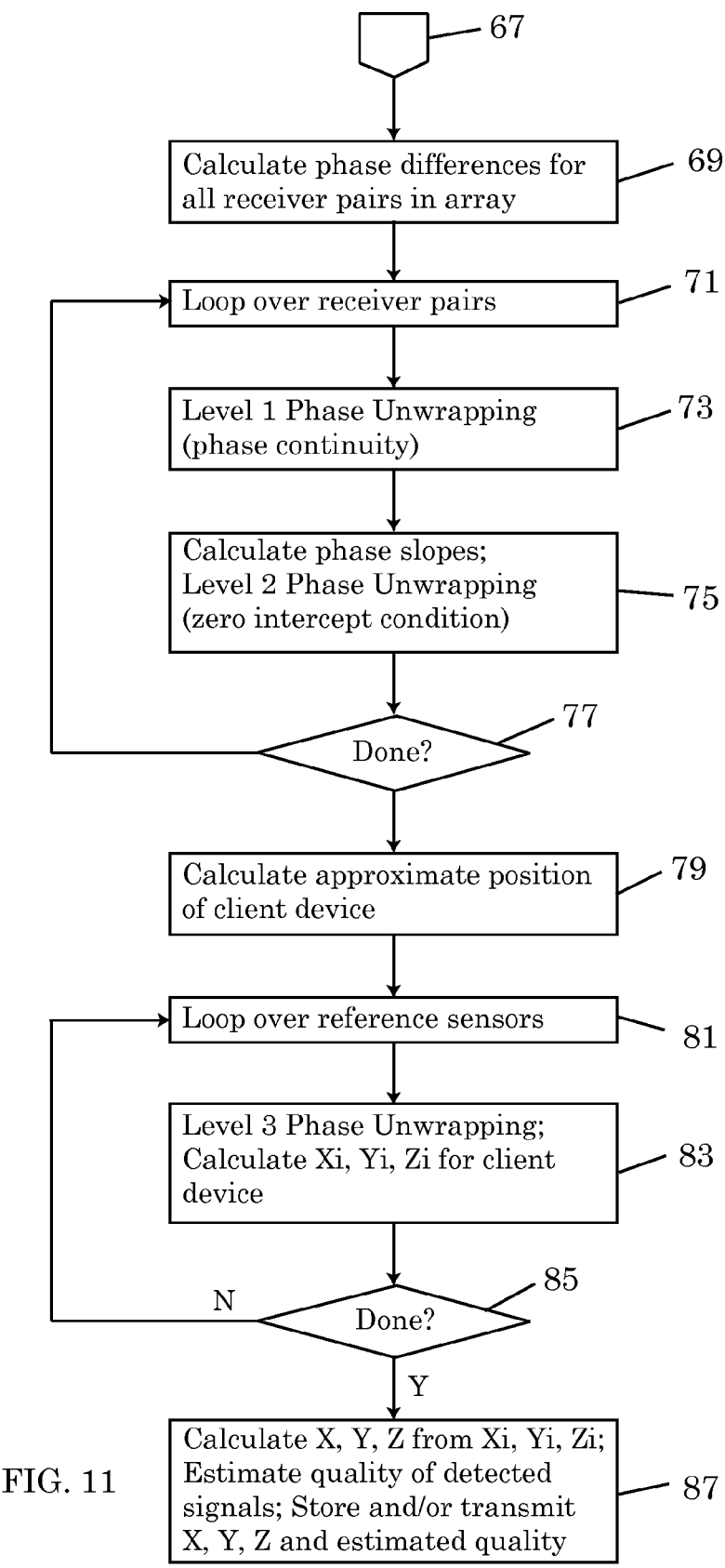
FIG. 11 is a flowchart illustrating a signal processing portion of a method for determining the position of a client device within a surveillance volume according to one embodiment of the present invention.

FIG. 11 is a flowchart of the signal processing portion of the method for determining a position of a client device (1 in FIG. 1) within a surveillance volume (3 in FIG. 1) according to one embodiment of the invention. In the embodiment shown in FIG. 11, the phase differences for all receiver pairs in the phase difference array are calculated from the acquired phase difference data (69). A receiver pair is selected from a set of receiver pairs (71). For a phase difference array having N=6 sensors, for example, there will be 15 receiver pairs in the set. For the selected receiver pair, a first level of phase unwrapping is performed to impose phase difference continuity within a frequency band (73). Next, phase slopes are calculated and a second level of phase unwrapping is performed to impose consistency of slope with zero intercept at zero frequency (75). The baseband processor checks to see if the last receiver pair in the set has been selected (77). If not, the method loops back to step 71 and repeats the process for another receiver pair. After looping over all the receiver pairs, the position determination process begins.

In the position determination process, an approximate position of the client device (1 in FIG. 1) is calculated (79). Then, one of the sensors is selected as a reference sensor (81). For the selected reference sensor, a third level of phase unwrapping is performed to ensure consistency of phase slopes across the phase difference array (83). In this step, the position $X_i$, $Y_i$, and $Z_i$ of the client device is determined (83). The baseband processor checks to see if all the sensors have had an opportunity to act as a reference sensor (85). If not, the method loops back to step 81 and repeats the process for another sensor as a reference sensor. After looping over all the sensors, $X_i$, $Y_i$, and $Z_i$ of the client device for i=1 . . . N, where N is the number of sensors, will be available. The collection of $X_i$, $Y_i$, and $Z_i$ can be averaged using any suitable averaging scheme, e.g., mean or median, to obtain a final single value of the position of the client device (87). The baseband processor can transmit the position obtained to a device within or outside of the surveillance volume (3 in FIG. 1). For example, the baseband processor may transmit the position to the backend server (13 in FIG. 1), WWW (17 in FIG. 1), or the client device (1 in FIG. 1). The backend server or WWW may use the position to provide a service to the user of the client device.

In addition to providing position information to a device within or outside of the surveillance volume (3 in FIG. 1), the baseband processor (23 in FIG. 2) can provide a measure of the quality of the signals obtained from the spatially diverse phase difference array (9 in FIG. 3). The quality of the detected signals has a direct bearing on the accuracy of the computations made by the baseband processor. The quality of the detected signals is impacted by multiple factors, including fading effects and competition for the position service from multiple users accessing the system at the same time. The baseband processor can provide an indication of the signal quality to the client device so that the user of the client device can reposition the client device, e.g., in order to change the signal strength for reliable positioning. The signal quality can be determined from the following outputs: the amplitude of the oscillation due to multipath interference around the measured phase difference slope (increases in oscillations due to multipath decreases accuracy of positioning) and the number of phase wrapping errors corrected by the third level of phase unwrapping (each phase wrapping error correction increases the robustness of the position calculation, hence fewer positioning failures, but decreases the overall accuracy of positioning). Good measures of signal quality enhance the user experience and constitute a competitive advantage for a commercial device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system of determining a position of a mobile device within a surveillance volume in the presence of multipath radio interference, comprising:

a spatially diverse phase difference array of N sensors for detecting radio frequency (RF) signals from the mobile device, wherein N is greater than 4, and acquiring phase difference data from the RF signals with respect to frequency at a plurality of frequencies between any selected pair of sensors, wherein spatial diversity of the array comprises at least one of the following: (1) separations between sensors in any selected sensor pair are different, (2) azimuth angles between sensor pairs are different, (3) distribution of azimuth angles of sensor pairs is uniform; (4) placement of three sensors along any given line between sensors is avoided, (5) any parallel orientations of sensor pairs are avoided, whereby as a result of the spatial diversity of the array, multipath phase difference errors in the measured phase difference measurements summed across the phase difference array is approximately zero; and a processor for determining the position of the mobile device from the phase difference data, the processor configured to determine phase difference with respect to frequency between any pair of sensors at a plurality of frequencies without use of a time reference, the processor configured to solve a system of at least N-1 independent nonlinear equations of the form $2d_{ij}(D_i+D_j)-2(x_j-x_i)X-2(y_j-y_i)Y+(x_j^2-x_i^2)+(y_j^2-y_i^2)=0$, where $d_{ij}$ is the phase difference acquired between i-th and j-th sensors, $D_i$ is the distance between the mobile device and the i-th sensor, the position of the i-th sensor is $(x_i, y_i, z_i)$, and the position of the mobile device is (X, Y, Z), whereby the position is iteratively determined using the system of equations to reduce effects of multipath interference.

2. The system of claim 1, wherein the phase difference array further comprises N receiver channels for receiving the RF signals detected by the N sensors.

3. The system of claim 2, wherein a particular frequency channel can be simultaneously selected for all the sensors in the spatially diverse array of N sensors.

4. The system of claim 3, wherein each receiver channel comprises at least one down-converter stage for down-converting a RF signal received in the receiver channel to an intermediate frequency signal.

5. The system of claim 4, wherein the phase difference array further comprises N-1 phase detectors for determining phase differences from the intermediate frequency signals.

6. The system of claim 1, wherein the spatially diverse array of N sensors is selected from the group consisting of a regular array, an irregular array, and a random array.

7. The system of claim 6, wherein the spatially diverse array of N sensors is a planar array or a non-planar array.

8. The system of claim 6, wherein the spatially diverse array of N sensors is configurable as a set of receiver pairs, each receiver pair consisting of a unique pair of the sensors in the spatially diverse array of N sensors.

9. A method of determining a position of a mobile device within a surveillance volume in the presence of multipath radio interference comprising:

synchronizing communications between a phase difference array comprising a spatially diverse array of N sensors and the mobile device, N being greater than 4, wherein spatial diversity comprises at least one of the following: (1) separations between sensors in any selected sensor pair are different; (2) azimuthal angles between sensor pairs are different; (3) distribution of azimuthal angles of sensor pairs is uniform; (4) placement of three sensors along any given line between sensors is avoided; and/or (5) any parallel orientations of sensor pairs are avoided, whereby, through said spatial diversity of the sensor in the array, multipath phase difference errors summed across the array are approximately zero;

acquiring phase difference data as a function of frequency between selected pairs of sensors using the phase difference array of claim 1;

determining phase differences for a plurality of receiver pairs defined for the phase difference array at a plurality of frequencies without the use of a time reference, each receiver pair consisting of a unique pair of the sensors in the spatially diverse array of N sensors;

determining the position of the mobile device from the phase differences by solving a system of at least N-1 independent nonlinear equations of the form $2d_{ij}(D_i+D_j)-2(x_j-x_i)X-2(y_j-y_i)Y+(x_j^2-x_i^2)+(y_j^2-y_i^2)=0$, where $d_{ij}$ is the phase difference determined between i-th and j-th sensors, $D_i$ is the distance between the mobile device and the i-th sensor, the position of the i-th sensor is $(x_i, y_i, z_i)$, and the position of the mobile device is (X, Y, Z), whereby the position is iteratively solved using the system of equations to reduce effects of multipath interference; and at least one of storing the position of the mobile device and transmitting the position of the mobile device to a location within or outside of the surveillance volume.

10. The method of claim 9, wherein acquiring phase difference data comprises acquiring RF signals and down-converting the RF signals to N intermediate frequency signals.

11. The method of claim 10, wherein determining phase differences comprises determining N-1 phase differences from N-1 combinations of the N intermediate frequency signals.

12. The method of claim 11, wherein determining phase differences comprises converting the N-1 phase differences from analog signals to digital signals.

13. The method of claim 9, wherein determining the position comprises looping over the receiver pairs and, for each loop, applying at least one phase unwrapping to the phase differences.

14. The method of claim 13, wherein applying the at least one phase unwrapping comprises adjusting the phase difference data to achieve continuity of the phase differences as a function of frequency across a given set of frequencies.

15. The method of claim 13, wherein applying the at least one phase unwrapping comprises calculating slopes from the phase difference data and adjusting the phase differences such that the slopes have a zero intercept at zero frequency.

16. The method of claim 13, wherein applying the at least one phase unwrapping comprises calculating slopes from the phase difference data and imposing overall consistency of measured path differences determined from the slopes with path differences expected given an approximate knowledge of the position of the mobile device.

17. The method of claim 16, further comprising estimating a position of the mobile device by calculating bearing angles of the mobile device using the phase difference data.

18. The method of claim 9, further comprising determining an indication of quality of RF signals from the mobile device by measuring a consistency of phase differences across the phase difference array.

19. The method of claim 18 further comprising at least one of storing the indication of quality and transmitting the indication of quality to the location within or outside of the surveillance volume.

20. The method of claim 9, further comprising acquiring the phase difference data over multiple samples during a fixed time of data acquisition.

21. The method of claim 9, further comprising providing a service to the mobile device based on the determined position of the mobile device.

* * * * *